(12) United States Patent
Koike et al.

(10) Patent No.: US 9,028,967 B2
(45) Date of Patent: May 12, 2015

(54) CHEMICALLY STRENGTHENED GLASS FOR DISPLAY DEVICE

(71) Applicant: Asahi Glass Company, Limited, Chiyoda-ku (JP)

(72) Inventors: Akio Koike, Tokyo (JP); Yuya Shimada, Tokyo (JP); Isao Saito, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 73 days.

(21) Appl. No.: 14/030,467

(22) Filed: Sep. 18, 2013

(65) Prior Publication Data

US 2014/0017500 A1    Jan. 16, 2014

Related U.S. Application Data

(63) Continuation of application No. PCT/JP2012/056721, filed on Mar. 15, 2012.

(30) Foreign Application Priority Data

Mar. 18, 2011 (JP) .................................. 2011-060407

(51) Int. Cl.
*C03C 21/00* (2006.01)
*C03C 3/085* (2006.01)

(52) U.S. Cl.
CPC ........... *C03C 21/002* (2013.01); *Y10T 428/315* (2015.01); *C03C 3/085* (2013.01); *C03C 21/00* (2013.01)

(58) Field of Classification Search
CPC ...... C03C 21/00; C03C 21/002; C03C 3/085; C03C 3/087
USPC ...................................... 428/410; 501/69, 70
See application file for complete search history.

(56) References Cited

U.S. PATENT DOCUMENTS

| | | | |
|---|---|---|---|
| 2005/0233891 A1* | 10/2005 | Cid-Aguilar et al. | 501/70 |
| 2006/0076105 A1 | 4/2006 | Furui et al. | |
| 2007/0012398 A1 | 1/2007 | Furui et al. | |
| 2007/0015654 A1* | 1/2007 | Scheffler-Hudlet et al. | 501/70 |
| 2007/0017639 A1 | 1/2007 | Furui et al. | |
| 2007/0099788 A1* | 5/2007 | Shelestak et al. | 501/64 |
| 2008/0286548 A1 | 11/2008 | Ellison et al. | |
| 2010/0206008 A1 | 8/2010 | Harvey et al. | |
| 2010/0210442 A1 | 8/2010 | Abramov et al. | |
| 2013/0291597 A1 | 11/2013 | Saito et al. | |
| 2013/0291598 A1 | 11/2013 | Saito et al. | |

FOREIGN PATENT DOCUMENTS

| | | |
|---|---|---|
| JP | 2006-236563 | 9/2006 |
| JP | 2006-256944 A | 9/2006 |
| JP | 2008-247038 A | 10/2008 |
| JP | 2010-89143 A | 4/2010 |
| JP | 2010-275126 | 12/2010 |

OTHER PUBLICATIONS

Extended European Search Report issued May 19, 2014 in Patent Application No. 12733997.6.
Extended European Search Report issued May 19, 2014 in Patent Application No. 12734331.7.
International Search Report issued Jun. 19, 2012 in PCT/JP2012/056721 filed Mar. 15, 2012.
Vincenzo M. Sglavo, Flaw-Insensitive Ion-Exchanged Glass: II, Production and Mechanical Performance, Journal of the American Ceramic Society, 2001, vol. 84, No. 8, pp. 1832-1838.

* cited by examiner

*Primary Examiner* — Kaj K Olsen
*Assistant Examiner* — Elizabeth A Bolden
(74) *Attorney, Agent, or Firm* — Oblon, McClelland, Maier & Neustadt, L.L.P.

(57) ABSTRACT

The present invention relates to a chemically strengthened glass for a display device, having a visible light transmittance Tva of 50% or more and less than 91% at a thickness of 1 mm using A light source, and an excitation purity Pe of less than 0.5% at a thickness of 1 mm.

20 Claims, 1 Drawing Sheet

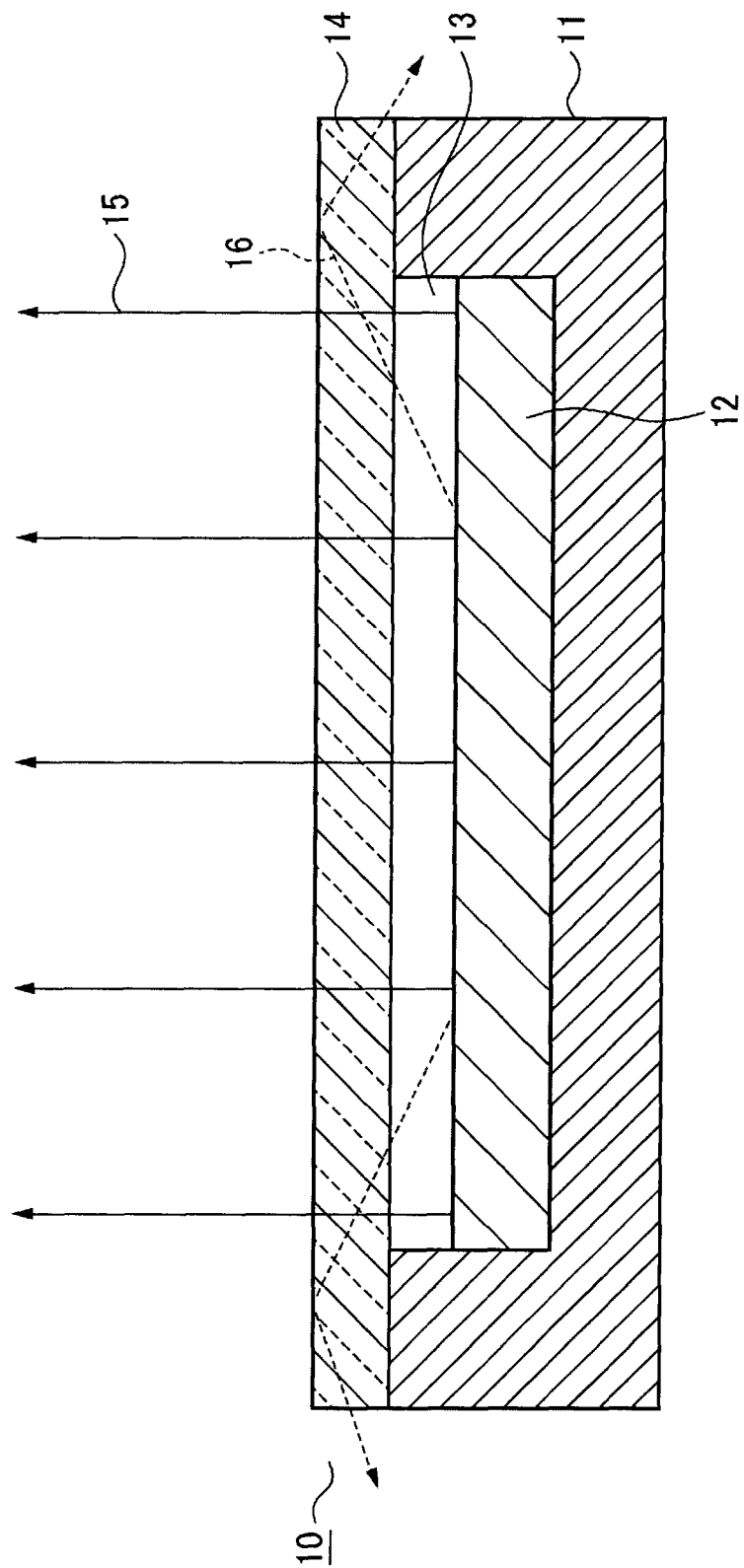

CHEMICALLY STRENGTHENED GLASS FOR DISPLAY DEVICE

TECHNICAL FIELD

The present invention relates to a glass sheet for use in a cover glass for a display device, typically a small display device such as a cell phone, a personal digital assistance (PDA), or a touch panel.

BACKGROUND ART

In recent years, for a mobile device such as a cell phone or a PDA, a cover glass (protective glass) for protecting the display and improving the appearance has been used in many cases. On the other hand, for such a mobile information device, weight reduction and thickness reduction are required. Therefore, a cover glass to be used for display protection is also required to be thin.

However, when the thickness of the cover glass is made to be thin, there has been a problem that the strength is lowered, the cover glass itself is broken by, for example dropping while using or carrying, and the cover glass cannot accomplish the essential role to protect a display device.

In order to solve the above problem, it is conceivable to improve the strength of the cover glass, and as such a method, a method of forming a compressive stress layer on a glass surface is commonly known. The representative method of forming a compressive stress layer on a glass surface is an air-blast quenching strengthening method (physical strengthening method) wherein a glass sheet surface heated to near the softening point is rapidly cooled by air-blast quenching or the like, or a chemical strengthening method wherein alkali metal ions having a small ion radius (typically Li ions or Na ions) at a glass sheet surface are exchanged with alkali ions having a larger ion radius (typically K ions) by ion exchange at a temperature lower than the glass transition point.

As mentioned above, the thickness of the cover glass is required to be thin. However, if the air-blast quenching strengthening method is applied to a thin glass sheet, since a temperature difference between the surface and the inside tends not to arise, it is difficult to form a compressive stress layer and an objective property of high strength cannot be obtained. Therefore, a cover glass strengthened by the latter chemical strengthening method is usually used (see Patent Document 1).

As mentioned above, a chemically strengthened glass obtained by chemically strengthening glass is very effective for protecting the display and improving the appearance in a mobile device such as a cellular phone or a PDA.

Since a usual glass, typically a soda lime silica glass or the like widely used as a window glass contains a minute amount of a coloring component such as Fe or Ti, the glass is colored yellow, green, or blue, unlike plastics, and thus it is difficult to obtain clarity and the appearance is not good. Particularly, in the case of a structure that the cross-section is uncovered, when the cover glass is viewed from the side, the cover glass is colored and the appearance is not good.

Moreover, since an optical path length varies between the case where it is viewed perpendicular to a display and the case where it is viewed laterally relative to the display, there is a problem that a tint varies depending on the angle when the glass is colored as mentioned above.

BACKGROUND ART DOCUMENT

Patent Document

[Patent Document 1] US-A1-2008-0286548

SUMMARY OF THE INVENTION

Problems that the Invention is to Solve

A glass obtained by chemically strengthening a usual glass as mentioned above has a problem of a tint as above but some of chemically strengthened glass sheets recently used as cover glasses for mobile devices have an extremely high transparency and thus the above problem has been solved.

The high transparency of such cover glasses is achieved by controlling impurities, for example, suppressing the Fe content to 200 ppm by mass or less. However, for regulating the amount of the impurities, it is necessary to use raw materials having an extremely high purity and thus there is a problem that production costs increase.

Moreover, since Fe is a component which absorbs a heat ray, Fe is a component preferably contained in a melting process of glass, which, for example, accelerates heat convection in molten glass to improve homogeneity of glass and prevents from increasing to high temperature in bottom bricks of a melting furnace to thereby extend a furnace life. Namely, the high transparency of the chemically strengthened glass sheet hitherto used as a cover glass is obtained at the sacrifice of the homogeneity of glass or the furnace life to a certain extent.

In addition, there is a concern that such a high transparency of the cover glass induces a problem of light leakage from the side in the cover glass of a liquid crystal display device or the like of a mobile device having a light source such as backlight. Namely, sides of the mobile device usually composed of housing sides and cover glass sides that are positioned at an upper part thereof are primarily not bright but, when light such as backlight leaks from the cover glass sides among the side of the mobile device, there is a concern that the appearance in the use of the mobile device is remarkably impaired.

FIG. 1 is a conceptual diagram illustrating a mechanism of generation of the above light leakage. A display device 10 comprises, as shown in FIG. 1, backlight 12 provided in a housing 11 and a cover glass 14 which is provided so as to cover the whole surface of a liquid crystal element 13 and surround the front of the housing 11. The light from the backlight 12 passes through the cover glass 14 as shown by an optical path 15 but, when the transparency of the cover glass 14 is too high, there is a case where the light leaks from the side of the cover glass 14 as shown by an optical path 16.

An object of the present invention is to provide a chemically strengthened glass for a display device which contains a coloring component such as Fe without extreme reduction and also does not impair the tint of the display, that is, which has clarity or may be said to be achromatic in the use as a cover glass or the like for a display device.

Another object of the invention is to provide a chemically strengthened glass for a display device, which can suppress the above light leakage.

Means for Solving the Problems

As a result of further extensive studies on the above problems, the present inventors have found that a chemically strengthened glass can be formed as one having clarity in the use as a cover glass or the like for a display device by controlling a visible light transmittance and an excitation purity to specific ranges.

The inventors have found that a chemically strengthened glass for a display device excellent in appearance is obtained by incorporating a plurality of coloring components so that a tint of a display is not impaired, while a coloring component such as Fe is contained.

The inventors have found a tint evaluation method of a chemically strengthened glass for a display device, which can judge whether the tint of a display is impaired or not and have found that a chemically strengthened glass for a display device which furthermore does not impair the tint of a display is obtained by using the method.

The inventors have found that, even when Fe alone is contained as a coloring component, a chemically strengthened glass can be formed as one which does not impair the tint of a display by controlling the Fe content to a specific range.

Namely, the gists of the invention are A and 1 to 13 as follows.

A. A chemically strengthened glass for a display device, having a visible light transmittance Tva of 50% or more and less than 91% at a thickness of 1 mm using A light source, and an excitation purity Pe of less than 0.5% at a thickness of 1 mm.

1. A chemically strengthened glass for a display device, having a visible light transmittance Tva of 50% or more and less than 90% at a thickness of 1 mm using A light source, and an excitation purity Pe of less than 0.5% at a thickness of 1 mm.

2. A chemically strengthened glass for a display device, having a visible light transmittance Tva of 50% or more and less than 91% at a thickness of 1 mm using A light source, and an excitation purity Pe of 0.25% or less at a thickness of 1 mm.

3. The chemically strengthened glass for a display device according to the previous section A, 1 or 2, which contains, in terms of oxides, 0.03% by mass or more of $Fe_2O_3$, 0.005% by mass or more in total of one or more components selected from the group consisting of $TiO_2$, $MnO_2$, $V_2O_5$, NiO, CoO, and $Cr_2O_3$, and 0.001% by mass or more in total of two or more components selected from the same group.

4. A chemically strengthened glass for a display device, having a visible light transmittance Tva of less than 91% at a thickness of 1 mm using A light source, an excitation purity Pe of less than 0.5% at a thickness of 1 mm, and (92-Tva)/Pe of 5.8 or more.

5. A chemically strengthened glass for a display device, which does not contain CoO, NiO, and $Cr_2O_3$ and contains 0.1% by mass or more and 0.6% by mass or less of $Fe_2O_3$ in terms of oxides, and wherein Redox is 55% or less.

6. A chemically strengthened glass for a display device, which contains, in terms of oxides, 0.03% by mass or more of $Fe_2O_3$, 0.0007% by mass or more of CoO, and 0.0025% by mass or more of NiO.

7. A chemically strengthened glass for a display device, which contains, in terms of oxides, 0.03% by mass or more of $Fe_2O_3$, 0.00050% by mass or more of CoO, and 0.005% by mass or more of $Cr_2O_3$.

8. The chemically strengthened glass for a display device according to the previous section A or any one of the previous sections 1 to 7, wherein the glass contains, as represented by mol % on the basis of oxides, from 50 to 74% of $SiO_2$, from 4 to 16% of $Al_2O_3$, from 0 to 10% of $B_2O_3$, from 0 to 16% of $Li_2O$, from 4 to 16% of $Na_2O$, from 0 and 8% of $K_2O$, from 3 to 15% of MgO, from 0 to 10% of CaO, and from 0 to 5% of $ZrO_2$, and wherein the sum of contents of $SiO_2$ and $Al_2O_3$ is 82% or less.

9. The chemically strengthened glass for a display device according to the previous section A or any one of the previous sections 1 to 8, wherein the glass does not contain BaO or contains less than 1% of BaO as represented by mol % on the basis of oxides.

10. The chemically strengthened glass for a display device according to the previous section A or any one of the previous sections 1 to 9, which contains less than 0.05% by mass of $SnO_2$ in terms of oxides.

11. The chemically strengthened glass for a display device according to the previous section A or any one of the previous sections 1 to 10, which is obtained by chemically strengthening a glass sheet produced by a float process, a downdraw process, a fusion process, or a roll-out process.

12. The chemically strengthened glass for a display device according to the previous section A or any one of the previous sections 1 to 11.

13. A display device comprising the cover glass according to the previous section 12.

Advantage of the Invention

According to the invention, a chemically strengthened glass for a display device that has clarity or may be said to be achromatic is obtained. In addition, according to the invention, the glass contains a plurality of coloring components so as not to impair a tint of a display while the glass contains a coloring component such as Fe, so that a chemically strengthened glass for a display device excellent in appearance [chemically strengthened glass of (1) to be mentioned later] is obtained. Moreover, according to the invention, even in the case where Fe alone is contained as a coloring component, a chemically strengthened glass can be formed as one which does not impair the tint of a display. Furthermore, since the chemically strengthened glass of the invention is achromatic without having any tint and has a high transparency and also the glass exhibits a little light leakage, it is excellent in appearance and practical use.

Furthermore, since the chemically strengthened glass of the invention contains Fe which is a component that absorbs a heat ray, it becomes easy to produce the glass in a large furnace to be used in a float process, a downdraw process, a fusion process, or a roll-out process.

BRIEF DESCRIPTION OF THE DRAWINGS

FIG. 1 is a cross-sectional view of a display device in which the chemically strengthened glass of the invention is used as a cover glass for a flat panel display.

MODE FOR CARRYING OUT THE INVENTION

A first embodiment of the invention is a chemically strengthened glass for a display device, having a visible light transmittance Tva of 50% or more and less than 91% at a thickness of 1 mm using A light source, and an excitation purity Pe of less than 0.5% at a thickness of 1 mm.

In the first embodiment of the invention, the visible light transmittance Tva of 50% or more and less than 91% at a thickness of 1 mm using A light source.

Tva is preferably less than 90%. By controlling Tva to less than 90%, even when Pe is a relatively large value, for example, more than 0.25% and less than 0.5%, the tint of a display is difficult to be impaired and Tva is more preferably less than 88%. Also, Tva is preferably 60% or more, more preferably 70% or more, and particularly preferably 80% or more.

In order to control Tva to 91% or more, it is necessary to increase the purity of raw materials, which requires production costs. Also, since a coloring component such as Fe cannot be contained, a component that absorbs a heat ray cannot be contained and hence the production in a large furnace becomes difficult. Moreover, by controlling Tva to 50% or more, a decrease in brightness is suppressed and the impairment of properties as a display can be prevented when the glass is used as a cover glass or the like.

In the case where Tva is controlled to 90% or more and less than 91%, it is preferable to control Pe to 0.25% or less in order that the tint of a display may not be impaired.

In the first embodiment of the invention, the excitation purity Pe at a thickness of 1 mm is less than 0.5, preferably less than 0.4, and more preferably 0.25% or less. When Pe is controlled to 0.25% or less, the tint of a display is not impaired even when Tva is, for example, such a relatively large value as 90% or more and less than 91%. The excitation purity Pe is usually measured using C light source.

When the excitation purity Pe is 0.5% or more, it is difficult to obtain clarity and the appearance is not good when the glass is used as a cover glass for a display. Particularly, in the case of a display cover structure where a cross-section of the cover glass is uncovered, the cover glass is colored when it is viewed from the side and thus the appearance is not good. Moreover, an optical path length varies between the case where it is viewed perpendicular to the display and the case where it is viewed laterally relative to the display and thus the tint varies depending on the angle.

Tva can be determined based on JIS R-3106 (1998) after a spectral transmittance curve is obtained on a spectrophotometer. Similarly, the excitation purity Pe can be determined from the spectral transmittance curve based on JIS Z-8722 (2009).

According to a preferable embodiment of the first embodiment of the invention, an achromatic chemically strengthened glass excellent in appearance is obtained by incorporating a plurality of coloring components so as not to impair the tint of a display while a coloring component such as Fe is contained so that the visible light transmittance Tva and the excitation purity Pe fall within the above ranges.

A second embodiment of the invention is a chemically strengthened glass for a display device, having a visible light transmittance Tva of less than 91% at a thickness of 1 mm using A light source, an excitation purity Pe of less than 0.5% at a thickness of 1 mm, and (92-Tva)/Pe of 5.8 or more. The excitation purity Pe is usually measured using C light source.

According to the second embodiment of the invention, it is possible to provide a chemically strengthened glass which can suppress light leakage while achieving a high transparency due to an achromatic without having any tint.

When the transparency of a cover glass is too high, light leakage from the side of the cover glass occurs and thus the appearance is not good. However, when the transparency is decreased, the glass is usually colored and, as mentioned above, an optical path length varies between the case where it is viewed perpendicular to the display and the case where it is viewed laterally, and thus there is a problem that the tint changes depending on the angle at which the display is viewed owing to the coloration of the glass.

In the second embodiment of the invention, light leakage can be suppressed. The visible light transmittance Tva in the second embodiment of the invention is less than 91%, preferably less than 90%, and more preferably less than 88%. Moreover, it is usually preferably 50% or more, more preferably 60% or more, further preferably 70% or more, and particularly preferably 80% or more.

Furthermore, the present inventors have found that whether the tint of a display is impaired or not can be judged by performing tint evaluation using a halogen light source to be mentioned later in the article of EXAMPLES. The inventors have found that, using the evaluation, an achromatic chemically strengthened glass having no tint is formed by controlling the excitation purity Pe at a thickness of 1 mm to less than 0.5% and controlling (92-Tva)/Pe to 5.8 or more.

In the second embodiment, the excitation purity Pe at a thickness of 1 mm is less than 0.5%, preferably 0.4% or less, more preferably 0.25% or less, and particularly preferably 0.2% or less. When the excitation purity Pe is 0.5% or more, there arises a problem that the glass does not become achromatic and the tint changes depending on the angle at which the display is viewed owing to the coloration of the glass.

The technical meaning of the expression (92-Tva)/Pe will be explained. The visible light transmittance Tva in the invention is defined by JIS R-3106 (1998) and is calculated from transmittance of each light having a wavelength of 380 to 780 nm according to a calculation expression defined in JIS R-3106 (1998). According to the calculation expression, a weighing factor is multiplied for transmittance at each wavelength and, when transmittance of light at full wavelength is high, as a result, the visible light transmittance Tva becomes high.

The excitation purity Pe in the second embodiment of the invention is defined in JIS R-8722 (2009) and is calculated from transmittance of each light having a wavelength of 380 to 780 nm. Similarly to the above, a weighing factor is multiplied for transmittance at each wavelength and, when transmittance of light at full wavelength is high, as a result, no difference is present when the visible light transmittance Tva is high, so that, as a result, the excitation purity Pe becomes small.

The excitation purity Pe is an index showing the distance from a white point of color coordinates and, when a glass is colored, the excitation purity Pe increases. Usually, when a glass is colored, the visible light transmittance decreases at a specific wavelength and thus the visible light transmittance decreases. Therefore, usually, the excitation purity Pe increases by the coloration of a glass and thereby the visible light transmittance Tva decreases. Thus, it is difficult to lower the excitation purity Pe and the visible light transmittance Tva simultaneously.

The expression (92-Tva)/Pe is an expression showing the relationship between the excitation purity and the visible light transmittance and indicates a slope of a graph in the case where the axis of ordinate is the excitation purity Pe and the axis of abscissas is the visible light transmittance Tva. "92" indicates that the reflection of a common silicate glass is 8% (total reflectance at rear and front sides) and transmittance in the case where absorption by the glass is absent when a light enters is usually 92%.

In the second embodiment of the invention, the expression (92-Tva)/Pe is 5.8 or more, preferably 6 or more, more preferably 8 or more, and particularly preferably 10 or more. By controlling the expression (92-Tva)/Pe to 5.8 or more, it is possible to decrease the visible light transmittance Tva and the excitation purity Pe simultaneously and thus an achromatic chemically strengthened glass having no tint can be formed.

As preferable embodiments of the chemically strengthened glass in the invention, the following (1) to (4) may be mentioned. In the present Description, for example, "contain, in terms of oxides, 0.03% by mass or more of $Fe_2O_3$" means that the $Fe_2O_3$ content is 0.03% by mass or more in the case where Fe is present in the glass in the form of $Fe_2O_3$.

(1) A chemically strengthened glass which contains, in terms of oxides, 0.03% by mass or more of $Fe_2O_3$, 0.005% by mass or more in total of one or more components selected from the group consisting of $TiO_2$, $MnO_2$, $V_2O_5$, NiO, CoO, and $Cr_2O_3$, and 0.001% by mass or more in total of two or more components selected from the same group.

(2) A chemically strengthened glass which does not contain CoO, NiO, and $Cr_2O_3$ and contains from 0.1 to 0.6% by mass or more of $Fe_2O_3$ in terms of oxides, and wherein Redox is 55% or less.

(3) A chemically strengthened glass which contains, in terms of oxides, 0.03% by mass or more of $Fe_2O_3$, 0.0007% by mass or more of CoO, and 0.0025% by mass or more of NiO.

(4) A chemically strengthened glass which contains, in terms of oxides, 0.03% by mass or more of $Fe_2O_3$, 0.00050% by mass or more of CoO, and 0.005% by mass or more of $Cr_2O_3$.

The chemically strengthened glass of the above (1) is preferably applied to the first embodiment of the invention and, in the case where it is used as a cover glass or the like, the effects in which the tint of a display is not impaired, that is, the display is achromatic while containing a coloring component such as Fe, are obtained.

Moreover, the chemically strengthened glasses of the above (2) to (4) are preferably applied to the second embodiment of the invention, and the effects in which light leakage can be suppressed while achieving a high transparency due to an achromatic without having any tint, are obtained. The following will explain the chemically strengthened glasses of (1) to (4).

(1) A chemically strengthened glass which contains, in terms of oxides, 0.03% by mass or more of $Fe_2O_3$, 0.005% by mass or more in total of one or more components selected from the group consisting of $TiO_2$, $MnO_2$, $V_2O_5$, NiO, CoO, and $Cr_2O_3$, and 0.001% by mass or more in total of two or more components selected from the same group In terms of the following oxides, the total amount of $Fe_2O_3$, $TiO_2$, $MnO_2$, $V_2O_5$, NiO, CoO, and $Cr_2O_3$ is preferably 0.05% by mass or more, more preferably 0.1% by mass or more, further preferably 0.15% by mass or more, and particularly preferably 0.2% by mass or more. The above components are coloring components. By controlling the total amount of these components to 0.05% by mass or more, it is possible to adjust the tint.

The Fe content is, as represented by mass % in terms of $Fe_2O_3$, preferably 0.03% or more, more preferably 0.05% or more, further preferably 0.08% or more, and particularly preferably 0.15% or more. Moreover, it is preferably 1.5% or less, more preferably 1.0% or less, and particularly preferably 0.5% or less.

Since Fe is a component that absorbs a heat ray, it is an essential component in a melting process of a glass, which, for example, accelerates heat convection in molten glass to improve homogeneity of glass and prevents a temperature increase to high temperature in bottom bricks of a melting furnace to extend a furnace life.

By controlling the Fe content to 0.03% or more, the absorption of a heat ray becomes sufficient and the merit of the above melting process is exerted. On the other hand, by controlling the Fe content to 1.5% or less, Tva is prevented from decreasing and also the problem that the amount of the coloring component increases because Pe is decreased, whereby color unevenness is prone to occur.

In terms of the following oxides, it is preferable that 0.005% by mass or more in total of one or more components selected from the group consisting of $TiO_2$, $MnO_2$, $V_2O_5$, NiO, CoO, and $Cr_2O_3$ is contained and 0.001% by mass or more in total of two or more components selected from the same group is contained.

Moreover, it is more preferable that 0.008% by mass or more in total of the one or more components is contained and 0.002% by mass or more in total of the two or more components is contained and it is particularly preferable that 0.01% by mass or more in total of the one or more components is contained and 0.003% by mass or more in total of the two or more components is contained.

The above components are coloring components and it is possible to adjust the tint by adjusting the content. Since there are a lot of the components that further absorb a heat ray, the production in a large furnace is facilitated by incorporating the components into a glass, which, for example, accelerates heat convection in molten glass to improve homogeneity of the glass and prevents a temperature increase to high temperature in bottom bricks of a melting furnace to extend a furnace life.

As a preferable embodiment, there may be, for example, mentioned one having an Ni content of 0.005 to 0.05% as represented by mass % in terms of NiO and a Co content of 0.001 to 0.1% as represented by mass % in terms of CoO. As a particularly preferable embodiment, there may be, for example, mentioned one having an Ni content of 0.01 to 0.03% as represented by mass % in terms of NiO and a Co content of 0.005 to 0.07% as represented by mass % in terms of CoO.

(2) A chemically strengthened glass which does not contain CoO, NiO, and $Cr_2O_3$ and contains 0.1% by mass or more and 0.6% by mass or less of $Fe_2O_3$ in terms of oxides, and wherein Redox is 55% or less By incorporating 0.1% by mass or more of $Fe_2O_3$ in terms of oxides, a cover glass having a high transparency and exhibiting a little light leakage is obtained. Also, by controlling the content to 0.6% by mass or less, the glass can be made achromatic without having any tint and the transparency and the visible light transmittance necessary as a display can be maintained.

The Fe content is, as represented by mass % in terms of $Fe_2O_3$, 0.1% by mass or more, preferably 0.15% by mass or more, and more preferably 0.3% by mass or more. Moreover, the Fe content is 0.6% by mass or less and preferably 0.5% by mass or less.

Incidentally, the chemically strengthened glass of (2) does not contain NiO, CoO, and $Cr_2O_3$ but may contain $TiO_2$, $MnO_2$, and $V_2O_5$.

Redox is a ratio of $Fe^{2+}$ to $Fe^{3+}$ and the tint of a glass varies depending on the value of Redox that is a ratio of $Fe^{2+}$ to $Fe^{3+}$ along with the Fe content in the glass. Redox is determined by dividing the mass of $Fe^{2+}$ content in terms of FeO by the mass of the total Fe amount in the glass in terms of FeO. The total Fe amount is determined by fluorescent X-ray.

The $Fe^{2+}$ content is determined in the following manner by wet analysis. In the wet analysis, a glass is first pulverized and the pulverized glass powder is dissolved with an aqueous HF solution to prepare a test liquid. The test liquid is mixed with a 2,2'-bipyridyl solution and an ammonium acetate solution to color, light absorption peak strength thereof is measured, and the amount of divalent iron is quantitatively determined based on a calibration curve prepared beforehand with standard samples.

Redox is 55% or less, preferably 50% or less, and more preferably 40% or less. Moreover, usually, it is preferably 10% or more, more preferably 15% or more, and further preferably 20% or more.

When Redox is more than 55%, the tint of the glass becomes worse and transparency decreases. Moreover, by increasing Redox to 80% or more, there is a concern that the glass is colored.

(3) A chemically strengthened glass which contains, in terms of oxides, 0.03% by mass or more of $Fe_2O_3$, 0.0007% by mass or more of CoO, and 0.0025% by mass or more of NiO The Fe content is, as represented by mass % in terms of $Fe_2O_3$, is 0.03% or more, preferably 0.05% or more, more preferably 0.08% or more, and particularly preferably 0.15% or more. Moreover, it is preferably 1.5% or less, more preferably 1.0% or less, and particularly preferably 0.5% or less.

When $Fe_2O_3$ is less than 0.03% by mass, the light leakage occurs and the appearance is not good.

The CoO content is 0.0007% by mass or more, preferably 0.001% by mass or more, and more preferably 0.002% by mass or more. When the CoO content is less than 0.0007% by mass, the glass is less prone to be achromatic and there tends to lead a problem that the tint varies depending on the angle at which a display is viewed owing to the coloration of the glass.

The NiO content is 0.0025% by mass or more, preferably 0.005% by mass or more, and more preferably 0.01% by mass or more. When the NiO content is less than 0.0025% by mass, the light leakage easily occurs and also the glass is less prone to be achromatic, so that there tends to lead a problem that the tint varies depending on the angle at which a display is viewed owing to the coloration of the glass.

(4) A chemically strengthened glass which contains, in terms of oxides, 0.03% by mass or more of $Fe_2O_3$, 0.00050% by mass or more of CoO, and 0.005% by mass or more of $Cr_2O_3$ The Fe content is, as represented by mass % in terms of $Fe_2O_3$, is 0.03% or more, preferably 0.05% or more, more preferably 0.08% or more, and particularly preferably 0.15% or more. Moreover, it is preferably 1.5% or less, more preferably 1.0% or less, and particularly preferably 0.5% or less.

When $Fe_2O_3$ is less than 0.03% by mass, the light leakage occurs and the appearance is not good. Moreover, by controlling the content to 1.5% by mass or less, the glass can be made achromatic and there is less prone to lead a problem that the tint varies depending on the angle at which a display is viewed owing to the coloration of the glass.

The CoO content is 0.00050% by mass or more, preferably 0.001% by mass or more, more preferably 0.0015% by mass or more, and particularly preferably 0.002% by mass or more. When the CoO content is less than 0.00050% by mass, the glass is less prone to be achromatic and there tends to lead a problem that the tint varies depending on the angle at which a display is viewed owing to the coloration of the glass.

The $Cr_2O_3$ content is 0.005% by mass or more, preferably 0.01% by mass or more, more preferably 0.015% by mass or more, and further preferably 0.02% by mass or more. When the $Cr_2O_3$ content is less than 0.005% by mass, the glass is less prone to be achromatic and there tends to lead a problem that the tint varies depending on the angle at which a display is viewed owing to the coloration of the glass.

In the chemically strengthened glasses of the above (3) and (4), Redox is preferably 15% or more and 80% or less, more preferably 15% or more and 60% or less, and further preferably 20% or more and 55% or less. Moreover, when Redox is 15% or more, the glasses can absorb a heat ray and accelerate heat convection in molten glass, whereby the glasses is melted easily in a large furnace. Furthermore, when Redox is 80% or less, coloration can be prevented.

In addition, the glass of the invention may contain a coloring component resulting from colloid coloring, such as Se, Au, Ag, or Cd. In the case where the glass contains the coloring component resulting from colloid coloring, such as Se, Au, Ag, or Cd, in terms of the following metals, at least one of Se, Au, Ag, and Cd is preferably contained in an amount of 0.001% by mass or more.

In the case where the glass of the invention is a glass sheet, the thickness is typically preferably from 0.2 to 2.0 mm and more preferably from 0.4 to 1.3 mm. When the thickness is less than 0.2 mm, there is a concern that a problem takes place from the viewpoint of practical strength even when the glass is chemically strengthened.

In the glass of the invention, surface compressive stress layer thickness (sometimes also referred to as compressive stress layer depth or surface stress layer depth) t is preferably 30 μm or more. In the case where the thickness is less than 30 μm, there is a possibility that a crack generated by the contact with an object penetrates the surface compressive stress layer to cause a remarkable decrease in strength. The thickness is more preferably 40 μm or more, further preferably 45 μm or more, and particularly preferably 50 μm or more.

The purpose of chemical strengthening of a glass is to provide a sufficient improvement in strength. Therefore, both the surface compressive stress S and the compressive stress layer depth t are preferably large.

In the glass of the invention, the surface compressive stress S is preferably 300 MPa or more. When it is less than 300 MPa, an improvement in strength is insufficient and there is a problem that the glass is prone to be broken through the contact with an object or the like. The stress is more preferably 400 MPa or more, further preferably 500 MPa or more, and particularly preferably 600 MPa or more. Moreover, the surface compressive stress S is preferably less than 1,100 MPa. When the stress is 1,100 MPa or more, internal tensile stress T increases and the glass is explosively broken upon breakage and thus is dangerous.

In the glass of the invention, in the case where polishing of the glass is performed, t is preferably 40 μm or more. Upon cover glass production, polishing of the glass is usually performed. The particle size of an abrasive to be used in the polishing at the first stage is typically 100 μm and it is considered that micro-cracks having a depth of 40 μm are formed by the polishing with such an abrasive (see FIG. 1.18 in p. 397 of "Glass Engineering Handbook" edited by Masayuki Yamane et al., First Edition, Asakura Publishing Co., Ltd., Jul. 5, 1999). In the case where t is less than 40 μm, there is a concern that the glass is broken at the polishing step. t is more preferably 50 μm or more and particularly preferably 60 μm or more.

In the glass of the invention, the internal tensile stress T is preferably less than 100 MPa. When the stress is 100 MPa or more, there is a case where the glass is explosively broken upon breakage and thus it is dangerous. The stress T is more preferably less than 80 MPa and particularly preferably less than 50 MPa.

The surface compressive stress S, the surface stress layer depth t, and the internal tensile strength T can be, for example, determined by the following method. Namely, S and t of a chemically strengthened glass sheet are measured by a surface stress meter FSM-6000 (manufactured by Orihara Industrial Co., Ltd.) and, from the measured value, the internal tensile strength T is determined by calculation according to the following equation (1). Here, d is thickness of the glass.

$$T = (S \times t)/(d - 2 \times t) \qquad (1)$$

In the case where the glass of the invention is used as a cover glass or the like, the glass is preferably a sheet-shaped. The method for producing the sheet-shaped glass of the invention is not particularly limited and, for example, the glass of the invention is produced by blending various raw materials in adequate amounts, charging them continuously into a large furnace, heating and melting them at about 1,400 to 1,600° C., subsequently homogenizing the resulting molten one through defoaming, stirring, or the like, shape-forming into a sheet-shaped glass by the well-known float process, downdraw process, fusion process, roll-out process, or the like, and, after annealing, cutting into a desired size and subjecting to polishing.

The glass of the invention is obtained by chemically strengthening a glass having predetermined physical properties.

The method for chemical strengthening is not particularly limited as long as alkali ions in the glass surface layer can be exchanged with alkali ions having a larger ion radius in a molten salt. For example, exchange of Na ions in the glass surface layer with K ions in a molten salt or exchange of Li ions in the glass surface layer with Na ions or K ions in a molten salt are performed.

Thus, the method for chemical strengthening is not particularly limited but, in Examples to be mentioned later, for the purpose of ion exchange of $Na_2O$ in the glass surface layer with $K_2O$ in a molten salt, chemical strengthening is performed by a method of dipping a glass sheet in a heated potassium nitrate ($KNO_3$) molten salt.

Conditions for forming a chemically strengthened layer (surface compressive stress layer) having a desired surface compressive stress in a glass sheet vary depending on the thickness of the glass sheet but typically, the glass sheet is dipped in a $KNO_3$ molten salt at 400 to 550° C. for 2 to 20 hours. From the economic viewpoint, it is preferable to dip the glass sheet under the conditions of 400 to 500° C. and 2 to 16 hours, and more preferable dipping time is from 2 to 10 hours.

The following will explain a preferable composition of the glass of the invention using contents represented by mole %. Here, the composition corresponds a composition of so-called mother glass.

$SiO_2$ is a component that constitutes the glass skeleton. The $SiO_2$ content is preferably 50% or more, more preferably 60% or more, further preferably 62% or more, and particularly preferably 63% or more. By controlling the $SiO_2$ content to 50% or more, stability as a glass is improved and also a decrease in weather resistance can be prevented.

The $SiO_2$ content is preferably 74% or less and more preferably 72% or less. By controlling the $SiO_2$ content to 74% or less, the viscosity of the glass can be suppressed and meltability can be improved.

$Al_2O_3$ is a component that improves the ion-exchange rate. The $Al_2O_3$ content in the glass of the invention is preferably 4% or more, more preferably 5% or more, and further preferably 5.5% or more. Moreover, the content is preferably 16% or less, more preferably 12% or less, further preferably 10% or less, and particularly preferably 9% or less.

By controlling the $Al_2O_3$ content to 4% or more, the ion-exchange rate can be improved. Moreover, by controlling the $Al_2O_3$ content to 16% or less, the viscosity of the glass can be suppressed and homogeneous melting is enabled.

The sum of the contents of $SiO_2$ and $Al_2O_3$ in the cover glass of the invention is preferably 82% or less and more preferably 80.5% or less. Moreover, it is preferably 66% or more, more preferably 68% or more, and particularly preferably 70% or more.

By controlling the sum of the contents of $SiO_2$ and $Al_2O_3$ to 82% or less, the viscosity of the glass at high temperature is suppressed and the glass becomes easy to melt. Moreover, by controlling the sum to 66% or more, a more stable glass is prone to obtain and also weather resistance can be improved.

$B_2O_3$ is not essential but may be contained for improving meltability at high temperature or glass strength. In the case where $B_2O_3$ is contained, the $B_2O_3$ content is more preferably 0.5% or more and further preferably 1% or more.

Moreover, the $B_2O_3$ content is preferably 10% or less, more preferably 6% or less, and further preferably 1.5% or less. By controlling the $B_2O_3$ content to 10% or less, facilitation of vaporization of $B_2O_3$ owing to the coexistence of alkali components is suppressed and a homogeneous glass can be obtained. In order to particularly improve the homogeneity, it is preferable to contain no $B_2O_3$.

$Li_2O$ is not essential but is a component that forms a surface compressive stress layer by ion exchange and also improves the meltability of the glass, and thus may be contained. In the case where $Li_2O$ is contained, the $Li_2O$ content is more preferably 1% or more and further preferably 3% or more.

Moreover, the $Li_2O$ content is preferably 16% or less, more preferably 14% or less, and particularly preferably 12% or less. By controlling the $Li_2O$ content to 16% or less, a decrease in strain point is suppressed, a stress relaxation is prevented, and a stable surface compressive stress layer can be obtained.

In addition, there is a case where $Li_2O$ is eluted into a molten salt of $KNO_3$ or the like upon the chemical strengthening treatment. When the molten salt contains the Li ion only in a minute amount, for example, in an amount of 0.005% by mass, the surface compressive stress remarkably decreases. Therefore, it is preferable to contain no $Li_2O$ from this viewpoint.

$Na_2O$ is a component that forms a surface compressive stress layer by ion exchange and also improves the meltability of the glass. The $Na_2O$ content is preferably 4% or more, more preferably 7% or more, and further preferably 8% or more. By controlling the $Na_2O$ content to 4% or more, a desired surface compressive stress layer is easily formed by ion exchange.

Moreover, the $Na_2O$ content is preferably 16% or less, more preferably 15% or less, further preferably 13% or less, particularly preferably 12% or less, and most preferably 11% or less. By controlling the $Na_2O$ content to 16% or less, a decrease in glass transition point Tg, i.e., strain point is suppressed and a decrease in weather resistance can be prevented.

$K_2O$ is not essential but is a component that improves the meltability and also enhances the ion-exchange rate to obtain desired S and t, so that $K_2O$ may be contained. In the case where $K_2O$ is contained, the $K_2O$ content is more preferably 1% or more and further preferably 3% or more.

Moreover, the $K_2O$ content is preferably 8% or less and more preferably 5% or less. By controlling the $K_2O$ content to 8% or less, a decrease in weather resistance can be prevented.

The sum $R_2O$ of the contents of $Li_2O$, $Na_2O$, and $K_2O$ is preferably from 12 to 25%, more preferably 13% or more, and further preferably 14% or more and is preferably 22% or less, more preferably 20% or less, and particularly preferably 18% or less.

By controlling $R_2O$ to 12% or more, desired ion-exchange properties can be obtained. Moreover, by controlling $R_2O$ to 25% or less, a decrease in chemical durability of the glass including weather resistance can be prevented.

Alkaline-earth metal oxides are components improving meltability and also are components effective for regulating Tg, i.e., strain point.

Of these, MgO is a component that increases Young's modulus, improves strength, and improves melting performance. The MgO content is preferably 3% or more, more preferably 5% or more, and particularly 8% or more. By controlling the MgO content to 3% or more, an improvement in strength and an improvement in melting performance become sufficient.

Moreover, the MgO content is preferably 15% or less, more preferably 14% or less, further preferably 13% or less, and particularly preferably 12% or less. By controlling the MgO content to 15% or less, a decrease in ion-exchange rate can be prevented.

Moreover, CaO is not essential and, in the case where CaO is contained, the CaO content is typically 0.05% or more. Furthermore, the CaO content is preferably 10% or less, more preferably 6% or less, further preferably 2% or less, and particularly preferably 0.5% or less. By controlling the CaO content to 10% or less, a decrease in ion-exchange rate can be prevented.

$ZrO_2$ is not essential but enhances the ion-exchange rate and improves Vickers hardness of the glass after chemical strengthening, so that $ZrO_2$ may be contained. In the case where $ZrO_2$ is contained, the $ZrO_2$ content is more preferably 0.1% or more, further preferably 0.3% or more, and particularly preferably 1.5% or more.

Moreover, the $ZrO_2$ content is preferably 5% or less and more preferably 3% or less. By controlling the $ZrO_2$ content to 5% or less, the saturation of the effect of enhancing the ion-exchange rate is suppressed and also the deterioration of meltability is prevented to suppress the occurrence of the case where components remain in the glass as unmolten matter.

It is preferable that the glass of the invention is essentially composed of the components described in the above, but the other components may be contained in the range where the object of the invention is not impaired. In the case where such components are contained, the sum of the contents of these components is preferably 10% or less and typically 5% or less. The following will illustratively explain the above other components.

SrO may be contained as necessary but, since an effect of decreasing the ion-exchange rate is large as compared with MgO and CaO, even in the case where SrO is contained, the content is preferably less than 1%, more preferably less than 0.5%, and particularly preferably less than 0.2%.

Since BaO exhibits the largest effect of decreasing the ion-exchange rate among the alkaline-earth metal oxides, BaO is not contained or, even in the case where BaO is contained, the content is preferably less than 1%, more preferably less than 0.5%, and particularly preferably less than 0.2%.

In the case where SrO or BaO is contained, the sum of the contents of them is preferably less than 1%, more preferably less than 0.5%, and particularly preferably less than 0.2%.

ZnO may be contained in a content of up to 2% for improving meltability of the glass at high temperature in some cases but the content is preferably 1% or less. In the case of the production by the float process or the like, the content is preferably 0.5% or less. By controlling the content to 0.5% or less, occurrence of product defects through reduction at the time of float molding can be prevented. Typically, ZnO is not contained.

As a refining agent at the time of melting the glass, $SO_3$, a chloride, or a fluoride may be appropriately contained.

In the glass of the invention, in the case where Sn is contained, the content is, as represented by mass % in terms of $SnO_2$, preferably less than 0.05% and more preferably less than 0.01%. By controlling the content to less than 0.05%, the difficultness of adjustment of the tint owing to valence change of the coloring component such as Fe can be prevented.

In the glass of the invention, in the case where Sb is contained, the content is, as represented by mass % in terms of $Sb_2O_3$, preferably less than 0.05% and more preferably less than 0.01%. By controlling the content to less than 0.05%, the difficultness of adjustment of the tint owing to valence change of the coloring component such as Fe can be prevented.

EXAMPLES

Each of the glass sheets (thickness: 4 mm, 0.7 mm, etc.; size: 50 mm×50 mm etc.) of Examples 1, 3 to 5, 7, 10, 16, 17, 20 to 22, and 28 in which $Fe_2O_3$, NiO, and CoO were contained in the ratio shown in the corresponding columns of Table 1 as represented by parts by mass in 100 parts by mass of mother glass whose composition as represented by mole % was as follows: $SiO_2$: 64.5%, $Al_2O_3$: 6.0%, $Na_2O$: 12.0%, $K_2O$: 4.0%, MgO: 11.0%, CaO: 0.1%, SrO: 0.1%, and $ZrO_2$: 2.5% was prepared by annealing a molten glass to room temperature, followed by cleaving, cutting, both surface mirror polishing, and the like.

Incidentally, in Table 1, the numerical value represented by parts by mass per 100 parts by mass of the mother glass is equal to the numerical value represented by mass %. For example, $Fe_2O_3$ in Example 1 is 0.20% by mass. Moreover, the contents of $SnO_2$ and $Sb_2O_3$ are both equal to or lower than detection limit and are less than 0.01% by mass.

Then, the glass sheet having a thickness of 0.7 mm was dipped in a molten salt in which $KNO_3$ and $NaNO_3$ were mixed in a ratio of 97:3 (mass ratio), at 450° C. for 3 hours to perform an ion-exchange treatment. After the ion exchange, the glass sheet was cooled to about room temperature to prepare a chemically strengthened glass sheet. The results of measuring the surface compressive stress S, the compressive stress layer depth t, and the internal tensile stress T of the chemically strengthened glass sheet were as follows: S=730 MPa, t=33 μm, and T=38 MPa.

The visible light transmittance Tva (%) at a thickness of 1 mm using A light source and the excitation purity Pe at a thickness of 1 mm of each glass are shown in the columns of Tva and Pe in Tables 1 to 4. Here, Pe is the excitation purity at a thickness of 1 mm using C light source.

Examples 1, 3 to 5, 7, 10, 16, 17, 21, 22, and 28 are Examples of the above first embodiments and Example 20 is Comparative Example of the same embodiment. Moreover, Examples 1, 3 to 5, 7, 10, 16, 17, 22, and 28 are Examples of the invention of the chemically strengthened glass for a display device of any of the above articles 1 to 9, and Examples 20 and 21 are Comparative Examples of the same invention. Furthermore, Examples 2, 6, 8, 9, 11, 18, 23 to 27, and 29 are Examples of the same invention and Examples 12 to 15, 19, 30, and 31 are Comparative Examples of the same invention.

As Example 32, when a bronze glass for window shield of automobiles typically containing 70.7% of $SiO_2$, 0.8% of $Al_2O_3$, 12.9% of $Na_2O$, 6.3% of MgO, 9.3% of CaO as represented by mole %, 0.12%, 0.04%, 0.004%, and 0.005% of $Fe_2O_3$, $TiO_2$, NiO, and CoO, respectively, as represented by oxide mass %, and 0.001% of Se as represented by metal mass % was investigated, Tva was 85.9% and Pe was 0.77.

Moreover, light leakage and a tint were evaluated on the glasses of Examples 1, 3 to 5, 7, 10, 16, 17, 20 to 22, and 28. Furthermore, evaluation of the light leakage and tint of the other glasses is also as shown in the table.

(Light Leakage Test 1)

A glass sheet was mirror-polished to about 4 mmt and high-quality paper was put on the upper surface. Light is allowed to enter from the lower surface at an output of 20% by means of a halogen light source apparatus LA-50UE (manufactured by Hayashi Watch-Works Co., Ltd.) and light leakage is observed from the mirror-polished edge. When the light source was allowed to enter into a place 15 mm apart from the edge, the case where the light leaks from the edge was marked "x" and the case where the light does not leak was marked "o".

(Light Leakage Test 2)

When the test was carried out in a similar manner to the light leakage test 1 with controlling an output of the light source to 10%, the case where the light leaks from the edge was marked "x" and the case where the light does not leak was marked "o".

(Tint)

A glass sheet was mirror-polished to about 4 mmt, light is allowed to enter from the lower surface at an output of 20% by means of a halogen light source apparatus LA-50UE (manufactured by Hayashi Watch-Works Co., Ltd.), and a tint was observed. The case where a tint was apparently felt was marked "x", the case where a tint was slightly felt was marked "Δ", and the case where any tint was not felt was marked "o".

TABLE 1

|  | Example 1 | Example 2 | Example 3 | Example 4 | Example 5 | Example 6 | Example 7 |
|---|---|---|---|---|---|---|---|
| $Fe_2O_3$ | 0.20 | 0.20 | 0.20 | 0.10 | 0.076 | 0.1575 | 0.05 |
| NiO | 0.0248 | 0.0248 | 0.0198 | 0.0124 | 0.0075 | 0.00891 | 0.0438 |
| CoO | 0.0061 | 0.0061 | 0.0518 | 0.0324 | 0.0045 | 0.00315 | 0.0208 |
| $TiO_2$ | — | — | — | — | — | — | — |
| $Cr_2O_3$ | — | — | — | — | — | — | — |
| $MnO_2$ | — | — | — | — | — | — | — |
| $V_2O_5$ | — | — | — | — | — | — | — |
| Redox (%) | 30.4 | 15.2 | 33.5 | 31.8 | 80.1 | 33 | 74.2 |
| Tva (%) | 85.9 | 85.9 | 86.4 | 88.4 | 87.7 | 87.9 | 88.7 |
| Pe (%) | 0.35 | 0.35 | 0.30 | 0.19 | 0.49 | 0.19 | 0.43 |
| (92 − Tva)/Pe (%) | 17.4 | 17.2 | 18.7 | 18.9 | 8.8 | 21.3 | 7.7 |
| Light leakage test 1 | o | o | o | x | o | o | x |
| Light leakage test 2 | o | o | o | o | o | o | o |
| Tint | o | o | o | o | Δ | o | Δ |

TABLE 2

|  | Example 8 | Example 9 | Example 10 | Example 11 | Example 12 | Example 13 | Example 14 | Example 15 |
|---|---|---|---|---|---|---|---|---|
| $Fe_2O_3$ | 0.035 | 0.046 | 0.35 | 0.04 | 0.025 | 0.042 | 0.0315 | 0.11 |
| NiO | 0.0043 | 0.0026 | 0.0198 | 0.00396 | 0.0030 | 0.0023 | 0.0026 | — |
| CoO | 0.0011 | 0.00090 | 0.0070 | 0.00236 | 0.0010 | 0.00080 | 0.00063 | — |
| $TiO_2$ | — | — | 0.3 | — | — | — | — | — |
| $Cr_2O_3$ | — | — | — | — | — | — | — | — |
| $MnO_2$ | — | — | — | — | — | — | — | — |
| $V_2O_5$ | — | — | — | 0.02 | — | — | — | 0.11 |
| Redox (%) | 33.1 | 38.6 | 32.8 | — | 35.2 | 36.1 | 32.1 | 32.4 |
| Tva (%) | 90.9 | 90.8 | 83.0 | 89.7 | 91.1 | 91.1 | 91.2 | 90.7 |
| Pe (%) | 0.09 | 0.06 | 0.42 | 0.25 | 0.11 | 0.06 | 0.07 | 0.35 |
| (92 − Tva)/Pe (%) | 22.0 | 19.0 | 21.4 | 9.2 | 8.3 | 15.2 | 10.8 | 3.7 |
| Light leakage test 1 | x | x | o | x | x | x | x | x |
| Light leakage test 2 | o | o | o | o | x | x | x | o |
| Tint | o | o | o | Δ | Δ | o | o | x |

TABLE 3

|  | Example 16 | Example 17 | Example 18 | Example 19 | Example 20 | Example 21 |
|---|---|---|---|---|---|---|
| $Fe_2O_3$ | 0.20 | 0.12 | 0.55 | 0.12 | 0.075 | 0.75 |
| NiO | — | — | — | — | — | — |
| CoO | — | — | — | — | — | — |
| $TiO_2$ | — | — | — | — | — | — |
| $Cr_2O_3$ | — | — | — | — | — | — |
| $MnO_2$ | — | — | — | — | — | — |
| $V_2O_5$ | — | — | — | — | — | — |
| Redox (%) | 26 | 26.7 | 23.8 | 62 | 28.5 | 25.9 |
| Tva (%) | 90.4 | 90.9 | 88.1 | 90.4 | 91.6 | 86.7 |
| Pe (%) | 0.20 | 0.17 | 0.46 | 0.40 | 0.07 | 0.61 |
| (92 − Tva)/Pe (%) | 8.1 | 6.5 | 8.5 | 4.0 | 5.7 | 8.7 |
| Light leakage test 1 | x | x | o | x | x | o |
| Light leakage test 2 | o | o | o | o | x | o |
| Tint | Δ | Δ | Δ | x | x | x |

TABLE 4

|  | Example 22 | Example 23 | Example 24 | Example 25 | Example 26 | Example 27 | Example 28 | Example 29 | Example 30 | Example 31 |
|---|---|---|---|---|---|---|---|---|---|---|
| $Fe_2O_3$ | 0.18 | 0.045 | 0.033 | 0.16 | 0.12 | 0.12 | 0.165 | 0.0033 | 0.027 | 0.033 |
| NiO | — | — | — | — | — | — | — | — | — | — |
| CoO | 0.0023 | 0.00070 | 0.00060 | 0.00175 | 0.0015 | 0.011 | 0.0025 | 0.00060 | 0.00070 | 0.00046 |
| $TiO_2$ | — | — | — | — | — | — | — | — | — | — |
| $Cr_2O_3$ | 0.0222 | 0.0056 | 0.0052 | 0.0193 | 0.0148 | 0.012 | 0.0165 | 0.0047 | 0.0052 | 0.0052 |
| $MnO_2$ | — | — | — | — | — | — | 0.15 | — | — | — |
| $V_2O_5$ | — | — | — | — | — | — | — | — | — | — |
| Redox (%) | 26.5 | 28.1 | 29.2 | 62.5 | 75 | 14.5 | 36.9 | 29.8 | 29.3 | 34.5 |
| Tva (%) | 87.4 | 90.6 | 90.8 | 88.3 | 88.9 | 89.7 | 88.7 | 90.8 | 90.6 | 91.1 |
| Pe (%) | 0.46 | 0.23 | 0.16 | 0.47 | 0.32 | 0.31 | 0.45 | 0.21 | 0.27 | 0.16 |
| (92 − Tva)/Pe (%) | 10 | 6.1 | 7.4 | 7.9 | 9.7 | 7.6 | 7.3 | 5.8 | 5.1 | 6.0 |
| Light leakage test 1 | ○ | x | x | x | x | x | x | x | x | x |
| Light leakage test 2 | ○ | ○ | ○ | ○ | ○ | ○ | ○ | ○ | ○ | x |
| Tint | ○ | Δ | Δ | Δ | Δ | Δ | Δ | Δ | x | Δ |

In the glasses of Examples 1, 3, and 4, three kinds of coloring components are contained, the total amount of $Fe_2O_3$, $TiO_2$, $MnO_2$, $V_2O_5$, NiO, CoO, and $Cr_2O_3$ is 0.05% by mass or more, $Fe_2O_3$ is 0.03% by mass or more, at least one of $TiO_2$, $MnO_2$, $V_2O_5$, NiO, CoO, and $Cr_2O_3$ is 0.005% by mass or more, and at least two of them is 0.001% by mass or more. Thus, since the amount of the coloring components is appropriately adjusted, the excitation purity Pe shows such a low value as less than 0.5 although the visible light transmittance Tva is 50% or more and less than 91%.

Moreover, the glass of Example 20 shows a high visible light transmittance Tva and a low excitation purity Pe but is a glass whose production cost is high since it is necessary to use highly pure raw materials for decreasing the Fe content, for example. Moreover, the cover glass of Comparative Example 7 has a high Fe content but, since the other coloring component is not contained, the excitation purity Pe became high. Furthermore, the glass of Example 32 is a bronze glass for window shield of automobiles but, since the amount of the coloring components was not appropriately adjusted, the excitation purity Pe was high.

In the glasses of Examples 4, 7, and 11, the visible light transmittance Tva was more than 88% and the result of the light leakage test 1 was x. Moreover, in the glasses of Examples 23 to 27, the visible light transmittance Tva was more than 91% and the result of the light leakage test 2 was x. From these results, it was realized that the light leakage of the cover glass can be effectively suppressed by controlling the visible light transmittance Tva to less than 91% and the effect of suppressing the light leakage can be enhanced by controlling Tva to less than 88%.

Moreover, the result of the tint test was ○ or Δ in the glasses of Examples 1 to 11, 16 to 18, and 22 to 29 where (92-Tva)/Pe was 5.8 or more but, in the glasses of Examples 15, 19, 20, and 30 where (92-Tva)/Pe was less than 5.8, the result of the tint test was x since absorption was little and color was distinct. Furthermore, the glass of Example 21 where (92-Tva)/Pe was 6 or more and the excitation purity Pe was 0.5% or more did not show light leakage but had a strong tint and thus was ranked x in the tint test.

From these results, it was realized that a glass having a visible light transmittance Tva of less than 91%, (92-Tva)/Pe of 5.8 or more, and Pe of less than 0.5% is achromatic with a suppressed tint, has a high transparency, and can suppress the light leakage.

From the results of Examples 1 to 11 and Examples 12 to 14, it was realized that a glass containing 0.03% by mass or more of $Fe_2O_3$, 0.0007% by mass or more of CoO, and 0.0025% by mass or more of NiO in terms of oxides can suppress the light leakage while achieving a high transparency due to an achromatic without having any tint.

Moreover, from the results of Examples 22 to 29 and Examples 30 and 31, it was realized that a glass containing 0.03% by mass or more of $Fe_2O_3$, 0.00050% by mass or more of CoO, and 0.005% by mass or more of $Cr_2O_3$ in terms of oxides can suppress the light leakage while achieving a high transparency due to an achromatic without having any tint.

Furthermore, from the results of Examples 16 to 18 and Examples 19 and 20, in the case where $Fe_2O_3$ is contained singly and NiO, CoO, and $Cr_2O_3$ are not contained, by controlling the $Fe_2O_3$ content to 0.1 to 0.6% by mass and controlling Redox to 55% or less, it was realized that a glass which can suppress the light leakage while achieving a high transparency due to an achromatic, is obtained.

While the invention has been described in detail with reference to specific embodiments thereof, it will be apparent to one skilled in the art that various changes and modifications can be made therein without departing from the spirit and scope thereof. Incidentally, the present application is based on Japanese Patent Application No. 2011-060407 filed on Mar. 18, 2011, and the contents are incorporated herein by reference.

INDUSTRIAL APPLICABILITY

The chemically strengthened glass of the present invention can be utilized as a cover glass for a display device.

The invention claimed is:

1. A chemically strengthened glass for a display device, having a visible light transmittance Tva of 50% or more and less than 90% at a thickness of 1 mm using A light source, and an excitation purity Pe of less than 0.5% at a thickness of 1 mm.

2. A chemically strengthened glass for a display device, having a visible light transmittance Tva of 50% or more and less than 91% at a thickness of 1 mm using A light source, and an excitation purity Pe of 0.25% or less at a thickness of 1 mm.

3. The chemically strengthened glass for a display device according to claim 1, which contains, in terms of oxides, 0.03% by mass or more of $Fe_2O_3$, 0.005% by mass or more in total of one or more components selected from the group consisting of $TiO_2$, $MnO_2$, $V_2O_5$, NiO, CoO, and $Cr_2O_3$.

4. The chemically strengthened glass for a display device according to claim 2, which contains, in terms of oxides, 0.03% by mass or more of $Fe_2O_3$, 0.005% by mass or more in total of one or more components selected from the group consisting of $TiO_2$, $MnO_2$, $V_2O_5$, NiO, CoO, and $Cr_2O_3$.

5. A chemically strengthened glass for a display device, having a visible light transmittance Tva of less than 91% at a thickness of 1 mm using A light source, an excitation purity Pe of less than 0.5% at a thickness of 1 mm, and (92-Tva)/Pe of 5.8 or more.

6. The chemically strengthened glass for a display device according to claim 5, which does not contain CoO, NiO, and $Cr_2O_3$ and contains 0.1% by mass or more and 0.6% by mass or less of $Fe_2O_3$ in terms of oxides, and wherein Redox is 55% or less.

7. The chemically strengthened glass for a display device according to claim 5, which contains, in terms of oxides, 0.03% by mass or more of $Fe_2O_3$, 0.0007% by mass or more of CoO, and 0.0025% by mass or more of NiO.

8. The chemically strengthened glass for a display device according to claim 5, which contains, in terms of oxides, 0.03% by mass or more of $Fe_2O_3$, 0.00050% by mass or more of CoO, and 0.005% by mass or more of $Cr_2O_3$.

9. The chemically strengthened glass for a display device according to claim 1, wherein the glass contains, as represented by mol % on the basis of oxides, from 50 to 74% of $SiO_2$, from 4 to 16% of $Al_2O_3$, from 0 to 10% of $B_2O_3$, from 0 to 16% of $Li_2O$, from 4 to 16% of $Na_2O$, from 0 and 8% of $K_2O$, from 3 to 15% of MgO, from 0 to 10% of CaO, and from 0 to 5% of $ZrO_2$, and wherein the sum of contents of $SiO_2$ and $Al_2O_3$ is 82% or less.

10. The chemically strengthened glass for a display device according to claim 2, wherein the glass contains, as represented by mol % on the basis of oxides, from 50 to 74% of $SiO_2$, from 4 to 16% of $Al_2O_3$, from 0 to 10% of $B_2O_3$, from 0 to 16% of $Li_2O$, from 4 to 16% of $Na_2O$, from 0 and 8% of $K_2O$, from 3 to 15% of MgO, from 0 to 10% of CaO, and from 0 to 5% of $ZrO_2$, and wherein the sum of contents of $SiO_2$ and $Al_2O_3$ is 82% or less.

11. The chemically strengthened glass for a display device according to claim 5, wherein the glass contains, as represented by mol % on the basis of oxides, from 50 to 74% of $SiO_2$, from 4 to 16% of $Al_2O_3$, from 0 to 10% of $B_2O_3$, from 0 to 16% of $Li_2O$, from 4 to 16% of $Na_2O$, from 0 and 8% of $K_2O$, from 3 to 15% of MgO, from 0 to 10% of CaO, and from 0 to 5% of $ZrO_2$, and wherein the sum of contents of $SiO_2$ and $Al_2O_3$ is 82% or less.

12. The chemically strengthened glass for a display device according to claim 1, wherein the glass does not contain BaO or contains less than 1% of BaO as represented by mol % on the basis of oxides.

13. The chemically strengthened glass for a display device according to claim 1, which contains less than 0.05% by mass of $SnO_2$ in terms of oxides.

14. The chemically strengthened glass for a display device according to claim 1, which is obtained by chemically strengthening a glass sheet produced by a float process, a downdraw process, a fusion process, or a roll-out process.

15. The chemically strengthened glass for a display device according to claim 2, which is obtained by chemically strengthening a glass sheet produced by a float process, a downdraw process, a fusion process, or a roll-out process.

16. The chemically strengthened glass for a display device according to claim 5, which is obtained by chemically strengthening a glass sheet produced by a float process, a downdraw process, a fusion process, or a roll-out process.

17. The chemically strengthened glass for a display device according to claim 1, which is a cover glass.

18. The chemically strengthened glass for a display device according to claim 2, which is a cover glass.

19. The chemically strengthened glass for a display device according to claim 5, which is a cover glass.

20. A display device comprising the cover glass according to claim 17.

* * * * *